(12) United States Patent
Robertson et al.

(10) Patent No.: US 7,115,164 B2
(45) Date of Patent: Oct. 3, 2006

(54) PREPARATION OF YELLOW PIGMENTS

(75) Inventors: George H. Robertson, Loveland, OH (US); Edward H. Sung, Cincinnati, OH (US); Veronica L. Chambers, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 11/068,138

(22) Filed: Feb. 28, 2005

(65) Prior Publication Data

US 2006/0191441 A1 Aug. 31, 2006

(51) Int. Cl.
- *C09B 67/20* (2006.01)
- *C09B 67/04* (2006.01)
- *C09B 67/10* (2006.01)

(52) U.S. Cl. .................. 106/496; 106/31.6; 106/31.78; 106/31.81; 106/498; 524/86; 524/91; 524/94

(58) Field of Classification Search ................ 106/496, 106/493, 498, 31.6, 31.78, 31.81; 524/86, 524/91, 94

See application file for complete search history.

(56) References Cited

U.S. PATENT DOCUMENTS

| 6,028,178 | A * | 2/2000 | Metz et al. .................. 534/581 |
| 6,117,606 | A * | 9/2000 | Macholdt et al. ....... 430/108.23 |
| 6,398,858 | B1 * | 6/2002 | Yu et al. ................... 106/31.64 |
| 6,476,222 | B1 * | 11/2002 | Smith et al. .................. 544/74 |

FOREIGN PATENT DOCUMENTS

| JP | 2001-164157 | | 6/2001 |
| JP | 2001-164157 A | * | 6/2001 |

OTHER PUBLICATIONS

Machine Assisted Translation for JP 2001-164157 (Jun. 2001).*
International Search Report for PCT/US2006/007038 dated Jun. 21, 2006.

* cited by examiner

*Primary Examiner*—Anthony J. Green
(74) *Attorney, Agent, or Firm*—Charles Achkar

(57) ABSTRACT

A process for the manufacture of a transparent Pigment Yellow 155 or transparent Pigment Yellow 180 is disclosed, said process includes grinding particles of said pigment in the presence of a grinding agent until said particles achieve a surface area of at least about 40 $m^2/g$.

16 Claims, 1 Drawing Sheet

PREPARATION OF YELLOW PIGMENTS

FIELD OF THE INVENTION

The invention relates to the preparation of Yellow 180 and Yellow 155 by milling processes.

BACKGROUND OF THE INVENTION

Printing ink, and special paint and plastics systems containing yellow pigments require strong color strength and transparent pigments.

Conventional Pigment Yellow 180 and Pigment Yellow 155 exhibit a color strength and opacity that limits their usefulness in printing inks, paints and plastics where high transparency is demanded. Examples of such conventional Pigment Yellow are described in U.S. Pat. Nos. 4,870,164, 6,022,659 and 6,028,178.

Accordingly, there exists a need for Pigment Yellow 155 and 180 having increased color strength and transparency and thus pigments with high surface area.

SUMMARY OF THE INVENTION

It has now been found that the above objectives can be realized by employing a process for the manufacture of a transparent Pigment Yellow 155 or transparent Pigment Yellow 180, said process comprising grinding particles of said pigment in the presence of a grinding agent until said particles achieve a surface area of at least about 40 $m^2/g$.

The present invention also provides a process for enhancing color strength, chroma or shade in an ink or a plastic composition comprising adding the transparent pigment of the present invention to said composition.

Other objects and advantages of the present invention will become apparent from the following description and appended claims.

DETAILED DESCRIPTION OF INVENTION

Figure 1:
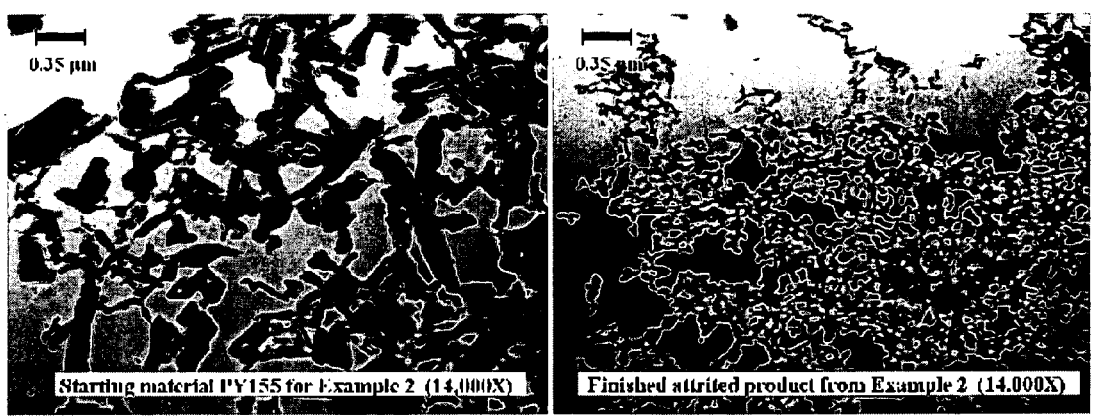
FIG. 1 shows the TEM of the starting material vs the processed material (dried and ground) from Example 2 (PY 155) and how the process produces a small particle sized material.

The present invention is a process for the manufacture of a transparent Pigment Yellow 155 and 180 which surprisingly, exhibits improvement in strength along with the improved transparency.

For the purpose of this invention, a transparent Pigment Yellow 155 or transparent Pigment Yellow 180 means a Pigment Yellow 155 or a Pigment Yellow 180 having a surface area of at least 40 $m^2/g$ preferably at least about 50 $m^2/g$ and more preferably about 50 $m^2/g$ to about 100 $m^2/g$.

The tranparent Pigment Yellow 155 or transparent Pigment Yellow 180 of the present invention can be isolated by a multitude of processes such as a process comprising: (a) preparing an aqueous slurry of the ground pigment; preferably at a temperature of about 50 to 90° C. (b) filtering said slurry resulting in a filter cake containing particles of transparent pigment; and (c) either (i) flushing the pigment from the presscake; or (ii) drying the presscake optionally followed by grinding. The isolation can further comprise washing the filter cake and drying it in an oven at a temperature of about 50 to 120° C.

The milling process may be carried out in a kneader, ball mill apparatus or any suitable such container. The process combines the large particle sized pigment and a grinding agent which are milled, with a wetting agent is necessary, then the prepared pigment is isolated with water, heated, and dried.

Suitable grinding agents for use in the process include, but are not limited to, salts such as inorganic salts like sodium chloride and combinations thereof. Typically, the salt is between about 1 to about 20 parts based on the crude pigment.

Suitable wetting agents for use in the process may include, but are not limited to, water miscible solvents and glycolic solvents such as ethylene glycol, diethylene glycol and carbitol acetate. It is preferred that the wetting agent is diethylene glycol.

The crude pigment and salt are combined in a mill container and milled at a temperature of about 50° C. to about 100° C. for about thirty minutes to about 20 hours. It is preferred that the milling temperature be abou about 20–100° C. for with a milling period of about 15–30 hours.

If a kneader is used, then the wetting agent is added. If a ball mil is used then balls are added, which may be of any appropriate material, such as, but not limited to glass, zirconium oxide, and the like. The balls typically have a size of about 0.5–10 mm and are added at about 100 to 200 parts based on the crude pigment.

Upon completion of the milling process, the pigment is isolated by preparing an aqueous slurry through mixing the mill contents with about 25 to about 250 parts water, then stirring at about 20° C. to about 100° C. for a period of about thirty minutes to about 3 hours. The resulting slurry is filtered and the filter cake is thoroughly washed with tap water until equivalent conductivity is attained, followed by deionized water, if desired. The washed filter cake is dried at about 45° C. to about 150° C. and optionally ground.

The resultant pure Yellow Pigment 155 or 180 may be formulated into a variety of printing ink systems resulting in yellow inks which are strong, cleaner and more transparent than corresponding inks made from the common commercial pigment. Similar exposure of the reduced ink film (ink tint) demonstrated only a minor decrease in the light fastness relative to the corresponding film of the common commercial pigment.

The process of the present invention is further illustrated by the following non-limiting examples in which all parts and percentages are by weight, unless otherwise indicated.

EXAMPLE 1

Into a 600-ml IKA kneader HKD 0.6 D were added NaCl salt (144 g), PV Fast Yellow HG 11-3073 (18 g, Pigment Yellow 180 supplied by Clariant), and diethylene glycol (32 g). After attrition for 6 hours at 80–90° C., the mixture was dispersed in 250 mL of water, heated to 90° C., filtered, washed with tap water to a low conductivity (<500 micromhos/cm), and dried at 70° C., then ground with an agate mortar and pestle.

TEM determination of the ground sample showed that it consists of smaller particles than pigments PV Fast Yellow HG and Toner Yellow HG (both supplied by Clariant). Specifically, the Surface Area of the ground material (determined by BET) was measured at 56 $m^2/g$ as compared with PV Fast Yellow HG which has a Surface Area of 35 $m^2/g$. Tested in an acrylic solvent paint system, the processed material appears much more transparent than PV Fast Yellow HG.

EXAMPLE 2

The process of Example 1 was repeated with a Pigment Yellow 155. The attached TEM in FIG. 1 below of the starting material vs the processed material (dried and ground as above) shows how the process produces a small particle sized material. The duplicate photomicrographs represent different areas in the electron microscope. Evaluated by the same procedure as Example 1, the Surface Area of the ground material (determined by BET) was measured at about 67 m$^2$/g as compared with the starting material which has a Surface Area of about 34 m$^2$/g. In addition, the small particle processed material shows greater transparency over the original. The processed material also shows a 20% strength advantage over the original in a TiO$_2$ tint paint.

The invention has been described in terms of preferred embodiment thereof, but is more broadly applicable as will be understood by those skilled in the art. The scope of the invention is only limited by the following claims.

What is claimed is:

1. A process for the manufacture of a transparent Pigment Yellow 155 or transparent Pigment Yellow 180, said process comprising: (a) grinding particles of said pigment in the presence of a grinding agent until said particles achieve a surface area of at least about 40 m$^2$/g; and (b) isolating said pigment by a process which comprises:
   (i) preparing an aqueous slurry of the ground pigment;
   (ii) filtering said slurry resulting in a filter cake containing particles of transparent pigment; and
   (iii) either (i) flushing the pigment from the filter cake; or (ii) drying the filter cake optionally followed by grinding.

2. The process of claim 1, wherein said pigment is Pigment Yellow 155.

3. The process of claim 1, wherein said pigment is Pigment Yellow 180.

4. The process of claim 1, wherein the grinding agent is an inorganic salt.

5. The process of claim 4, wherein the inorganic salt is sodium chloride.

6. The process of claim 1, wherein said grinding is carried out in the presence of a wetting agent.

7. The process of claim 6, wherein the wetting agent is a glycolic solvent.

8. The process of claim 7, wherein the glycolic solvent is selected from the group consisting of ethylene glycol, diethylene glycol and carbitol acetate.

9. The process of claim 1, wherein said grinding is carried out at a temperature of about 20 to 100° C. for a period of about 15 to 30 hours.

10. The process of claim 1, wherein the slurry is heated at a temperature of about 50 to 90° C.

11. The process of claim 1, wherein particles of said transparent pigment have a surface area of at least about 50 m$^2$/g.

12. The process of claim 11, wherein said surface area is about 50 to about 100 m$^2$/g.

13. The process of claim 1, further comprising washing the filter cake with water and drying it in oven at a temperature of about 50 to 120° C.

14. A process for enhancing color strength, chroma or shade in an ink or a plastic composition comprising adding the transparent pigment produced according to claim 1 to said composition.

15. The process of claim 14, wherein particles of said transparent pigment has a surface area of at least about 50 m$^2$/g.

16. The process of claim 15, wherein said surface area is about 50 to about 100 m$^2$/g.

* * * * *